(12) United States Patent
Spitzer et al.

(10) Patent No.: US 6,876,307 B1
(45) Date of Patent: Apr. 5, 2005

(54) SYSTEM FOR ASSISTING THE OPERATOR OF A TECHNICAL APPLIANCE

(75) Inventors: Manfred Spitzer, Ulm (DE); Stefan Hahn, Ulm (DE); Markus Hess, Stuttgart (DE); Ulrich Kressel, Ulm (DE); Siegfried Rothe, Denkendorf (DE); Walter Ziegler, Stuttgart (DE)

(73) Assignee: DaimlerChrysler AG (DE)

( * ) Notice: Subject to any disclaimer, the term of this patent is extended or adjusted under 35 U.S.C. 154(b) by 922 days.

(21) Appl. No.: 09/691,552

(22) Filed: Oct. 18, 2000

(30) Foreign Application Priority Data

Oct. 29, 1999 (DE) .......................................... 199 52 506

(51) Int. Cl.⁷ ................................................. G08B 3/00
(52) U.S. Cl. .................... 340/691.6; 340/438; 340/439; 340/457; 340/459
(58) Field of Search ................................. 340/438, 439, 340/457, 459, 691.6

(56) References Cited

U.S. PATENT DOCUMENTS

| | | | | | |
|---|---|---|---|---|---|
| 4,219,800 | A | * | 8/1980 | LeViness | 340/457 |
| 5,721,679 | A | * | 2/1998 | Monson | 701/207 |
| 6,472,977 | B1 | * | 10/2002 | Pochmuller | 340/425.5 |
| 6,525,656 | B1 | * | 2/2003 | Hahn | 340/463 |
| 6,650,251 | B2 | * | 11/2003 | Gerrity | 340/963 |

\* cited by examiner

*Primary Examiner*—Daryl C Pope
(74) *Attorney, Agent, or Firm*—Pendorf & Cutliff

(57) ABSTRACT

The invention concerns a system for assisting an operator of a technical appliance, with a image display device (2), of which the image is in the normal field of vision of the operator, for display of operationally relevant information in the form of images or symbols (1). According to the invention, a respective image or symbol is displayed at least once for a brief period of time, of which the duration is below the threshold of conscious recognition and above the threshold of subconscious recognition of the operator.

15 Claims, 2 Drawing Sheets

SYSTEM FOR ASSISTING THE OPERATOR OF A TECHNICAL APPLIANCE

BACKGROUND OF THE INVENTION

Field of the Invention

The invention concerns a system for assisting an operator of a technical appliance, with an image display device, of which the image is provided within the normal viewing field of the operator, for indication of operationally relevant information in the form of images or symbols.

Modern warning systems are being designed to warn the automobile operators of dangerous situations, of which the recognition has hitherto been the sole responsibility of the driver. For example, a "curve warner" provides the operator with early warning of the encountering of curves, which are too tight for the actual driving speed. Presently, this warning occurs using acoustic enunciators, for example "sharp left curve ahead," and/or by offering optical warning signals in the dashboard or reflected into the windshield.

This type of warning system is, as a rule, so designed, that the warning of a danger only occurs when it is to be presumed that the driver has not himself recognized this danger, since otherwise the acceptance and the effect of the warning information would be ignored or lost. In many warning systems, it is however difficult or even impossible to determine or fix a suitable time point for generating the warning. On the one hand, the warning must occur early enough so that the driver can be appraised of the dangerous situation, should he not have recognized it himself. On the other hand, the warning should not occur so early, that a driver, who has already recognized the danger and intends to take appropriate measures, is unnecessarily disturbed or distracted. These two requirements can frequently not be accommodated at the same time.

The same dilemma occurs in warning or information systems for other technical apparatus other than automotive vehicles. For example, the operator of a machine or industrial apparatus is normally optically or acoustically warned or informed when particular situations occur which might possibly necessitate a rapid intervention. Too early or, as the case may be, too many warning signals could lead thereto that the attentiveness of the operator is reduced with time and important information is disregarded. On the other hand, the warning should not occur so late, that the operator might possibly not be able to react.

The invention is accomplished with providing the optical information for such a short period of time, that it is not consciously recognized, however is registered by the person. This phenomenon, referred to as "visual priming," is described for example by A. J. Marcel in Conscious and unconscious perception: Experiments on visual masking and word recognition, Cognitive Psychology 15 (1983), Pages 197–237. The best known example of this phenomenon is the exchange of individual frames of a film sequence with frames having a completely different content, which the observer does not consciously comprehend during watching of the film, but which however do affect his perceptions or, as the case may be, his behavior.

This effect is used in the invention for sub-threshold warning, informing, or influencing of the operator of a machine. This makes possible for example a warning without distracting signals such as the illumination of lights or warning noises with conventional warning systems.

During experiments for carrying out the invention, it has been demonstrated that the sub-threshold offering of operationally relevant information in an image display, of which the image is in the normal visual field of the operator, effectively sensitizes the operator to the offered information. Thereby, the reaction time of the operator is substantially reduced when the situation, to which he was unconsciously prepared, actually occurs. The operator is however not disturbed or distracted by the information offered on the sub-threshold level. Thus, the operationally relevant information can immediately be displayed for a short period of time after the appropriate situation has been recognized, that is, without consideration as to whether the operator has initiated any manipulations.

According to the invention, an image or symbol, which reflects the operationally relevant information, is displayed at once for a short period of time, wherein the duration of the display is preferably below that of conscious recognition and above that of subconscious recognition of the operator. Therein, the threshold of subconscious recognition is defined as the display duration with which the information is just barely accepted unconsciously, that is, has an effect on the later behavior of the operator, and the conscious recognition threshold is the duration of display at which the operator becomes conscious of the information.

These two recognition thresholds can, by the way, be influenced by the size and magnitude or intensity of the displayed image and, besides this, by whether the image or symbol is offered in the center of the field of vision or at the edge. It has been shown that a short time presentation in the periphery of the visual field influences the cognition or recognition or, as the case may be, the behavior of the operator.

Basis on the condition that the operationally relevant information could be offered even in the periphery of the field of vision of the operator, the invention is suitable also for technical appliances, such as for example, an automobile.

When adapting the invention to an automobile, one employs normally one or more devices for automatic recognition of situations, which may possibly require a reaction of the automobile driver, and a device for controlling the image display device, in order to display the appropriate operationally relevant information as soon as the appropriate situation is recognized.

For recognition of dangerous situations, there can be employed for example devices for recognition of an inappropriate speed of the vehicle prior to a curve, for recognition of traffic signs, for recognition of road conditions, for recognition of traffic signals, for recognition of approach situations, for recognition of crossing situations, for recognition of pedestrians and/or for recognition of low stimulation or signal intensity and tedious driving situations.

The invention is suitable not only for sensitization with respect to dangerous situations, but rather also to sensitize automobile drivers or operators of other technical apparatus to various other important conditions without imposing or disturbing, i.e. conditions which might possibly require a reaction. Devices for recognition of various possible important situations during the operation of a vehicle, which can advantageously be combined or utilized with the present invention, are for example a navigation device and/or a device for monitoring of operational values of the vehicle, for example the status of the fuel.

The recognition signals of the above-mentioned devices can in many ways be combined with each other, in order to prepare the information and in present it in an optimal manner to the driver. For example one symbol may be a symbol, which alerts the driver below the threshold of recognition to the possible need of a fuel stop, and can be given exactly then when the navigation system determines that a filling station is being approached. The briefly displayed images or symbols can be pictures of corresponding situations, pictograms, traffic symbols, arrows or written words.

In a preferred embodiment, the image display device is a so-called heads-up display. In an automobile, one realizes a heads-up display thereby that the image information is reflected into the visual field of the driver via the windshield. The reflected image information can in a first stage or level be the conventional operating parameters such as RPM, speed, blinker, etc. and the operationally relevant information according to the invention can supplementally be reflected or reflected during an appropriate short time fade-out of the main image.

The invention is also suitable for retrofitting to vehicles, which have for example conventional individual instruments on the instrument panel. In such a case, it can be useful when all the short time images are reflected via the windshield into the visual field of the driver.

For adapting a motorcycle or other machine or vehicle, which has no suitable reflecting device such as a windshield, a heads-up display can be designed in the manner of, for example, glasses or goggles wearable by the operator.

In place of a heads-up display, the image display device can be a pixel based controllable display screen for direct viewing by the operator, for example an LCD-display on the instrument panel, upon which important operational parameters of the vehicle are represented. As already described, the briefly offered images, even when peripherally displayed, leave behind a measurable impression with the driver, so that it is not detrimental when he normally does not look directly at the image screen or, as the case may be, in complex driving situations frequently changes his direction of viewing.

For safety, the short time images can also be offered multiple times sequentially at spaced-apart time intervals. This is possible, since in accordance with the invention it is not necessary to wait to see whether the driver reacts by himself. Rather, all necessary warning or other information can be given immediately, so that substantially more time latitude exists than with conventional warning systems.

It is useful when the duration, with which the respective image or symbol is displayed for a short period of time, can be adjusted or controlled by the operator. Thereby, the operator can adapt the system precisely to his personal threshold of recognition. In order to facilitate this, the system can offer an appropriate adjustment procedure, through which the operator is guided.

BRIEF DESCRIPTION OF THE DRAWINGS

Further characteristics and advantages of the invention can be seen from the following description of embodiments and from the figures, to which reference is made. There is shown.

DETAILED DESCRIPTION OF THE INVENTION

A system for assisting a vehicle operator includes for example a device for recognition of an inappropriate speed of the vehicle prior to a curve, a device for recognition of traffic signs, a device for recognition of the road conditions, a device for recognition of traffic signals, a device for recognition of approach situations, a device for recognition of crossing situations, a device for recognition for pedestrians and/or a device for recognition of difficult to recognize and tedious driving situations.

Besides this, there is a freely or variably programmable display device in the vehicle, for example an LCD-display in the instrument panel, on which the operating parameters such as for example, speed, RPM, etc. are displayed. Alternatively, the display device can be a heads-up display.

Figure 1:
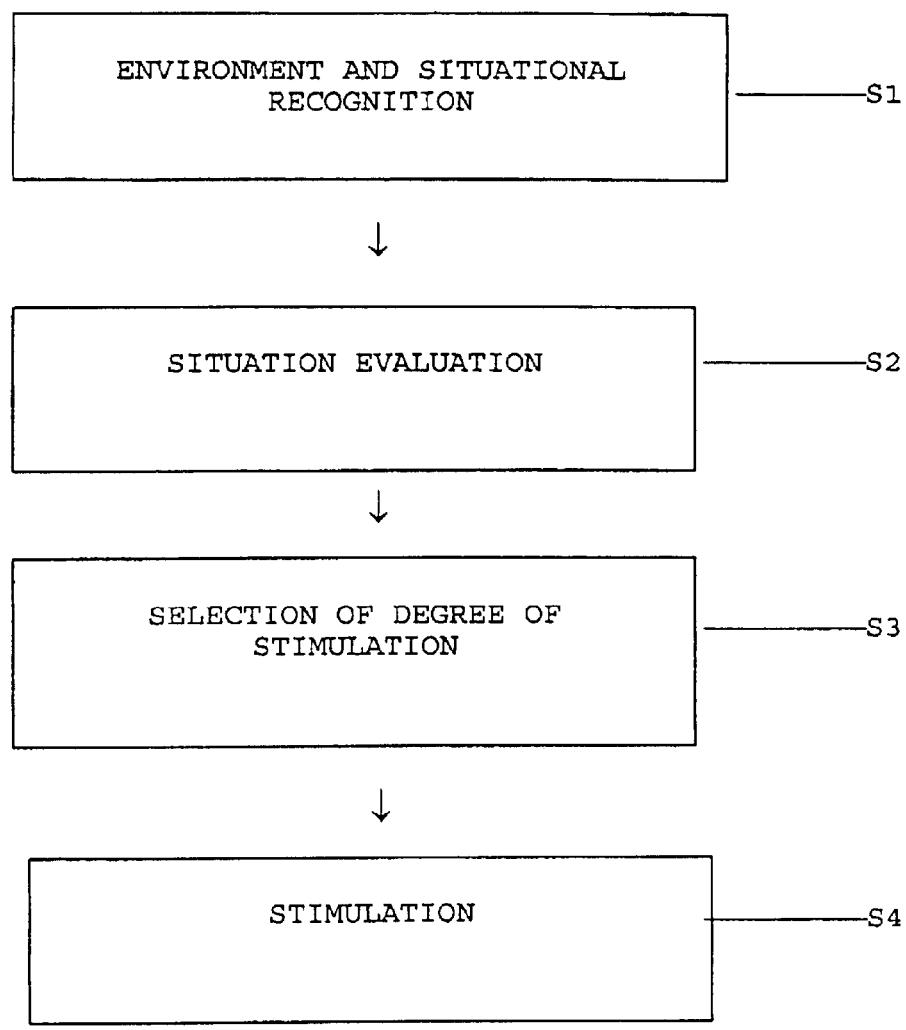
FIG. 1—a flow diagram for illustrating the process steps in a system for assisting the operator of a technical appliance using sub-threshold display of information, and FIG. 2—a test apparatus for determining the effectiveness of the invention.

As shown in FIG. 1, upon recognition of a particular environment or situation (S1) the recognized situation is evaluated (S2) with respect to its danger potential or, as the case may be, its importance. Subsequently, there occurs a selection of a suitable excitation or stimulation based on type and duration (S3), wherein the appropriate images or symbols and the appropriate display duration can be stored, for example in a storage chip or component. Subsequently, there occurs the stimulus (S4), in which the image or symbol is briefly displayed on the display device. These process steps can be carried out or, as the case may be, controlled by a suitably programmed microprocessor.

The respective display durations are determined in advance for example by testing. The display duration is selected to be so short, that the appropriate image or symbol is just below the threshold level of conscious recognition of the driver.

Test Device 1

A test vehicle with a variously controllable display screen on the instrument panel in place of the conventional individual instruments was so modified, that the reaction of the driver to traffic signs and traffic lights could be measured. The reaction time of a sufficiently large number of test persons was measured once with and once without subconscious optical sensitization. For sensitization of the test persons, symbols of the traffic signals or, as the case may be, traffic lights were displayed approximately 50 ms on the display screen, before the traffic signs or, as the case may be, traffic lights actually appeared in the visual field of the test person. With this subconscious sensitization, a significant reduction of the reaction time of 50 ms in comparison to the reaction time without sensitization resulted.

Test Device 2

A similar test vehicle with an image display screen displaying a combination of instruments was allowed to follow a preceding vehicle traveling at 20–40 km/h. The test person was required to operate the brake pedal as soon as the brake light of the lead vehicle was illuminated. Coincidentally, in half the cases, the image of two illuminated backlights (vehicle stoplights) was blended into the combination instrument, before the vehicle brake lights actually illuminated. The duration of the blending in of the display of the image was selected to be so short, that the driver did not consciously recognize the images.

Figure 2:
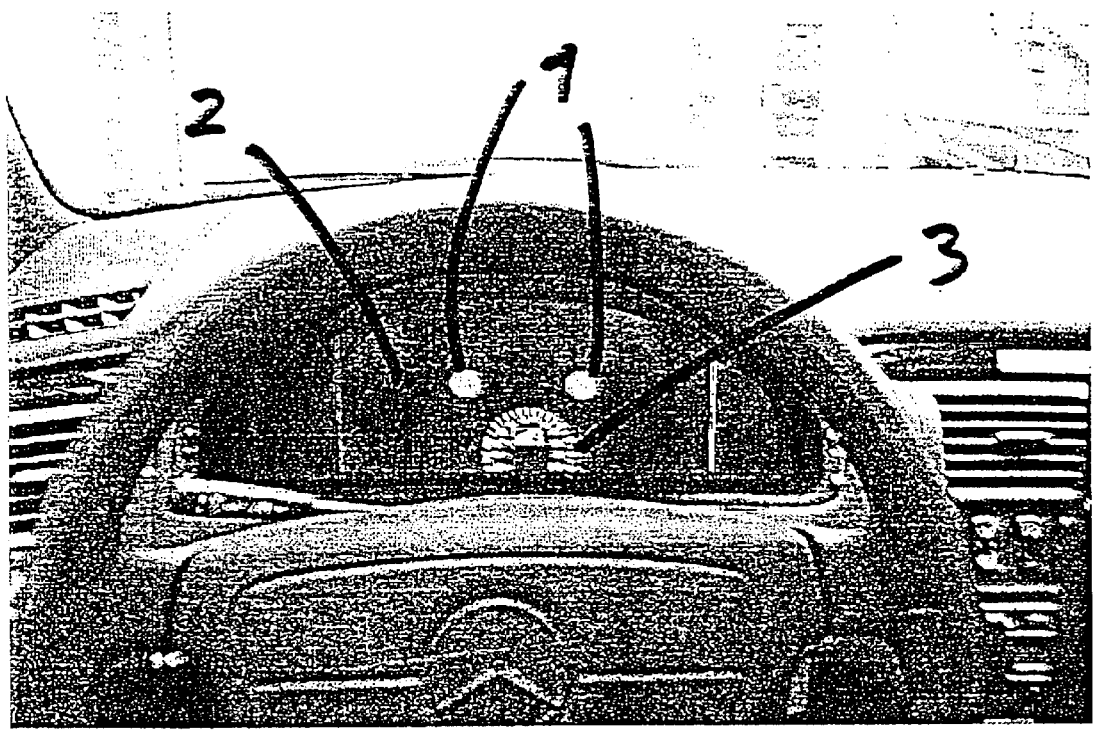

FIG. 2 shows the instrument panel of the test vehicle from the 15 view of the driver at precisely the instant, in which the symbolic image 1 of two backlights appear in the combination instrument 2 outside the tachometer 3. The preceding or lead vehicle is not shown in FIG. 2. In the cases with subconscious sensitization, a significant reduction of the reaction time of 150 ms occurred in comparison to the cases without sensitization.

The described test systems were designed especially for testing the effectiveness of the invention and do not represent a commercially suitable warning system. The person working in this art would, however, recognize that the use of many warning systems for vehicle drivers, which are presently available, can be substantially improved in accordance with the present invention. For example, if one associated the curve warner with the present invention in such a manner that the driver is presented with the clearly recognizable optical warning signal (for example the traffic symbol for "curve") mirrored in windshield or displayed on the instrument panel with a duration below the threshold of recognition. As a warning signal, it would also be possible to use the image of a typical curve with a radius or curvature as detected by the curve warner.

If one takes into the consideration the fact that 90% of all accidents of vehicles could be prevented if the driver had better control over the vehicle in the last 500 ms prior to the accident, then the invention makes it possible, to increase the attention of the driver in the decisive phases, without however unintentionally disturbing or distracting him.

In comparison to conventional warning systems, the information offered below the threshold of recognition can always be offered, even independent of whether or not the operator has actually recognized a dangerous situation. For example, in situations, in which the vehicle is urgently to be brought to a halt, for example at a red light or a stop sign, it is useful, to offer the warning information independent of whether or not the operator has actually taken action or not.

What is claimed is:

1. A system for assisting an operator of a technical appliance, said system including an image display device for displaying information in the form of an image or symbol in the normal field of vision of the operator in situations requiring reaction of the operator, wherein said image or symbol (1) is displayed at least once for a brief period of time, and wherein the duration of the display is below the threshold of recognition and above a subconscious threshold of detection of the operator.

2. A system according to claim 1, wherein the operationally relevant information is displayed briefly immediately after recognition of the appropriate situation.

3. A system according to claim 1, wherein the operationally relevant information is warning information.

4. A system according to claim 1, wherein the technical appliance is an automotive vehicle.

5. A system according to claim 1, further including
at least one device for automatic recognition of situations which may require the reaction of the automotive vehicle operator and
a device for controlling the image display device (2) to display appropriate operationally relevant information when the device for automatic recognition recognizes an appropriate situation.

6. A system according to claim 5, wherein the situation to be recognized is a danger situation.

7. A system according to claim 5, wherein the at least one device for automatic recognition of situations is one or more of the following devices:
a) a device for recognition of an inappropriate speed of the vehicle prior to a curve,
b) a device for recognition of traffic signs,
c) a device for recognition of road conditions,
d) a device for recognition of traffic signals
e) a device for recognition of approach situations,
f) a device for recognition of crossing situations,
g) a device for recognition of pedestrians,
h) a device for recognition of low signal amplitude and tedious driving situations.

8. A system according to claim 5, wherein the at least one device for automatic recognition of situations includes a navigation device and/or a device for monitoring operational values of the vehicle.

9. A system according to claim 5, wherein the briefly displayed images or symbols (1) include one or more of the following objects:
a) images of appropriate situations,
b) pictograms,
c) traffic signals,
d) arrows,
e) written words.

10. A system according to claim 1, wherein the image display device is a heads-up display.

11. A system according to claim 1, wherein the heads-up display is wearable by the operator in the manner of at least one of glasses or goggles.

12. A system according to claim 1, wherein the image display device is a display screen (2) for direct observation by the operator.

13. A system according to claim 12, wherein the display screen is a display screen (2) with controllable pixels on the instrument panel for representation of operating parameters of the vehicle.

14. A system according to claim 1, wherein the duration with which a respective image or symbol (1) is briefly displayed is adjustable by the operator.

15. A system for assisting an operator of a technical appliance, said system including an image display device for displaying information relevant to the operator for operating the technical appliance in the form of an image or symbol in the normal field of vision of the operator, wherein said image or symbol (1) is displayed at least once for a brief period of time, and wherein the duration of the display is below the threshold of recognition and above a subconscious threshold of detection of the operator.

* * * * *